United States Patent [19]

Parmann

[11] 4,299,412
[45] Nov. 10, 1981

[54] PRODUCTION OF SOCKET ENDS IN THERMOPLASTIC PIPES

[75] Inventor: Gunnar Parmann, Bergen, Norway

[73] Assignee: Rieber & Son A/S, Bergen, Norway

[21] Appl. No.: 847,440

[22] Filed: Nov. 1, 1977

[30] Foreign Application Priority Data

Aug. 29, 1977 [NO] Norway .................. 772972

[51] Int. Cl.³ ............................. F16L 17/02
[52] U.S. Cl. .................... 285/110; 285/260;
285/345; 285/379; 285/423; 425/393; 29/423
[58] Field of Search ............ 277/205, 207, 235;
285/110, 230, 231, 260, 374, 423, 345; 425/384,
393, DIG. 218, 392; 264/249, 313; 29/235, 423

[56] References Cited

U.S. PATENT DOCUMENTS

| | | | |
|---|---|---|---|
| 2,314,386 | 3/1943 | Brend | 285/374 X |
| 2,430,836 | 11/1947 | Taylor | 27/205 X |
| 3,377,659 | 4/1968 | Hulks | 425/392 |
| 3,498,623 | 3/1970 | Rowe | 277/207 A |
| 3,520,047 | 7/1970 | Muhlner et al. | 285/231 |
| 3,520,541 | 7/1970 | Rohuni | 285/379 X |
| 3,674,279 | 7/1972 | McMurray | 277/205 |
| 3,695,639 | 10/1972 | Shire | 285/231 |
| 3,792,878 | 2/1974 | Freeman | 285/347 |
| 3,807,027 | 4/1974 | Heisler | 264/269 X |
| 3,924,999 | 12/1975 | Harris et al. | 425/392 |
| 3,942,935 | 3/1976 | Heisler | 425/393 |
| 4,030,872 | 6/1977 | Pormonn | 425/DIG. 44 |

FOREIGN PATENT DOCUMENTS

276884 12/1969 Austria .................. 285/110
940833 11/1963 United Kingdom .......... 285/110

*Primary Examiner*—Dave W. Arola
*Attorney, Agent, or Firm*—Kenyon & Kenyon

[57] ABSTRACT

Combined mould and sealing element suitable for sealing off a joint between a socket end and an insert end of two cooperating pipes formed from a thermoplastic material and for being used as a portion of a body of a mould for both fabricating said socket end of the one pipe and simultaneously inserting said element in an internal groove in the socket end produced thereby. The element consists of a main body of annular form composed of an elastically yielding material housing a reinforcing core of relatively non-elastic material capable of retaining its shape relative to the main body. The main body has a radial outer portion which in its active condition is adapted to abut the bottom of the internal groove and in its inactive condition projects outwardly as a flap. Between the flap and an inner and opposing portion of the main body there is formed an opening dimensioned to facilitate ready introduction and housing of the core. The flap has a wall thickness which is locally reduced at a position remote from its free end which permits ready bending and clamping of the flap against the inner portion to close off the opening in the active condition.

10 Claims, 13 Drawing Figures

PRODUCTION OF SOCKET ENDS IN THERMOPLASTIC PIPES

This invention relates to the production of socket ends in thermoplastic pipes.

It is possible to utilise various types of socket-forming apparatuses as shown in U.S. Pat. No. 3,776,682 or U.S. Pat. No. 3,793,427. In connection with the drift of the socket-forming apparatus, there can be utilised a special, separate element which, during the production of the socket end, is supported on the drift of the apparatus and serves as a mould element for the formation of the annular groove in the socket end and which, after the production, is retained permanently in the socket end and serves as a sealing element.

In manufacturing according to the aforesaid U.S. patents, there is mainly considered forming the socket end by pushing the hot, plastic pipe end directly along the drift and the mould element which is disposed on the drift. Alternatively, a socket end can be produced in a manner known per se by initially producing a stretched out pipe end which can be threaded in a cold or cooled condition and without hindrance into position over the drift and the mould element so as, on heating the stretched out pipe end thereafter, to allow the latter to be moulded via the drift and associated mould element into a desired form with the mould element secured in the socket end in the form of a sealing element in the latter.

Such a combined mould and sealing element in which the element consists of a rubber ring and a reinforcing element which is displaceably received in the rubber ring, is disclosed as the one embodiment of Norwegian Patent Specification No. 133,818. The known element of said type is, however, encumbered with the disadvantage that problems can arise in getting the reinforcing ring inserted in a rapid and simple way while complying with the simultaneous demand of being able to secure the reinforcing ring in an intentionally accurate and reliable manner in the rubber ring. Such retention of the reinforcing ring is especially necessary during mounting of an insert end in a cooperating socket end, that is to say on pushing the insert end into sealing engagement with the element in the socket end, as well as later during use of the produced pipe conduit, that is to say during use of the element as the sealing element of the socket end against the insert end.

An object of the present invention is to provide a combined mould and sealing element for use in producing socket ends in thermoplastic pipes which permits easy and rapid mounting of a reinforcing core in a main body of the element composed of elastically yielding material while enabling the core of relatively non-elastic material to be housed therein in a secure and reliable manner.

Accordingly, the present invention resides in a combined mould and sealing element suitable for sealing off a joint between a socket end and an insert end of two cooperating pipes formed from thermoplastic material and for being used as a portion of a body of a mould for both fabricating the socket end of one pipe and simultaneously inserting the element in an internal groove in the socket end produced thereby. The element consists of a main body of annular form composed of an elastically yielding material housing a reinforcing core of relatively non-elastic material capable of retaining its shape relative to the main body. The main body has a radial outer portion adapted in its active condition to abut the bottom of the internal groove and in an inactive condition to project freely outwards as a flap to define with an inner and opposing portion of the body an opening dimensioned to facilitate ready introduction and housing of the reinforcing core in the main body. This flap has a wall thickness which is locally reduced at a position remote from its free end to permit ready bending and clamping of the flap against the inner and opposing portion to close off the opening and thereby simultaneously preclude access to the reinforcing core on completing the transition from the inactive to the active condition.

The invention also includes a process for producing a socket end in a thermoplastic pipe which comprises
(a) arranging the combined mould and sealing element on a drift in its inactive condition,
(b) moulding the socket end in the pipe by the steps of
 (i) passing one end of the pipe while hot over the drift and its associated combined mould and sealing element and
 (ii) radially compressing the pipe end against the drift and the element thereby forming an internal groove in the socket end, and
(c) permanently locating the element in the groove by bending and clamping the flap against the inner and opposing portion of the main body of the element during at least one of steps (i) and (ii) to close off the opening therebetween and preclude access to the reinforcing core on completing the transition from the inactive to the active condition.

The possibility, therefore, exists of being able to effect an especially easy and uncomplicated insertion of the reinforcing core, e.g., steel, metal, rigid plastic ring etc., of circular or various other suitable cross-sections in the annular main body, e.g., a rubber ring or ring of other similar material, manually as well as by machine. After this one can, by means of a simple process and by means of a known socket-forming apparatus close the introduction opening or the insert gap in the element during the production of the socket end so that the reinforcing ring is maintained reliably in position in the rubber ring.

The element can be assembled beforehand and arranged in a ready assembled condition directly in position on the drift. Alternatively, the main body can initially be arranged in position on the drift and thereafter the reinforcing core can be mounted in place in the main body. In both instances, the mounting of the reinforcing core in the main body can be carried out in an easy manner since a relatively wide opening in the insert gap may be employed. When the hot pipe end is thereafter moulded over the mould element on the drift of the socket-forming apparatus, the insert gap can be readily closed and thereby effectively shut off the reinforcing core in the main body.

In order to obtain for the main body especially low priced rubber rings particularly in large dimensions and small quantities, these can be made by extrusion, that is to say a rubber profile strand can be extruded which is cut into suitable lengths and thereafter joined together into ring form. Finally, the reinforcing core in the form of a ring can be mounted in place in the rubber ring to form the combined mould element and sealing element. The production of a reinforced element, that is to say a rubber ring with associated reinforcing rings is relatively expensive to carry out by small quantities and big dimensions, i.e. diameters above 8 to 10 inches, connected to the rubber ring. In this instance, the rubber ring and reinforcing ring are made separately and assembled thereafter to form the said reinforced element. This element is locked, by the process according to the invention, reliably and effectively in position in the fabricated socket end, by moulding the socket end over the element and following this by locking the reinforcing element in the socket end by cooling the latter. By so producing the rubber ring, a reinforcing ring can be inserted therein in a ready manner of almost arbitrary cross-sectional profile thereby obtaining particular and especially desired effects. The relatively wide insert gap to the cavity in the rubber ring makes possible such an easy introduction, while the locking of the outer flap in the socket end on producing the socket end ensures an effective utilisation of the special properties of the reinforcing ring.

By the aid of simple means an element can be obtained with significant advantages over the hitherto known element. These advantages are connected, in part, to the production of the socket end by the process according to the invention, while further advantages, as will be described later, are connected to the use characteristics of the produced socket end with associated sealing element.

In order that the invention can be more clearly understood, convenient embodiments thereof will now be described, by way of example, with reference to the accompanying drawings in which.

Figure 1:
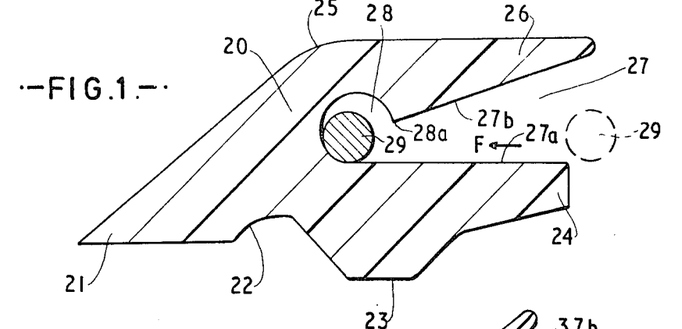
FIGS. 1 to 3 are schematic representations, in cross-section, of three different embodiments in which the introductory step of mounting a reinforcing ring in a rubber ring to form the combined element is illustrated.

Referring to FIG. 1, there is shown the cross-section of a rubber ring 20 having a conically pointed end portion 21 which on the inner side of the ring extends over into a concave cavity 22 which continues as a convex projection 23 and is completed with a thickly terminated end portion 24. On the outer side of the rubber ring, the conical end portion 21 continues, via a convexly curved top portion 25, with a flap 26 laterally directed from the top portion. Between the flap 26 and the end portion 24, there is formed an inwardly coverging gap 27 which, innermost, is terminated by a circular cavity 28. The inner surface 27a of the gap 27 is flush with the inner part of the cavity 28, while the outer surface 27b of the cavity, that is to say the inwardly directed surface of the flap, together with the cavity 28 defines an inwardly directed shoulder portion 28a. A reinforcing ring 29 of circular cross-section is shown in dotted lines in a position immediately before mounting. The reinforcing ring 20 is displaced along the inner surface 27a of the gap 27 and inwardly into the cavity 28 to the position which is shown in full lines 29. It is evident that the reinforcing ring can be displaced rather easily in the direction of the arrow F in an unhindered manner along the inner surface 27a of the gap 27 and also unhindered initially by the outer surface 27b of the gap but, at the inner end of the gap 27, the ring 29 must pass the shoulder portion 28a with a catch or snap action.

Figure 2:
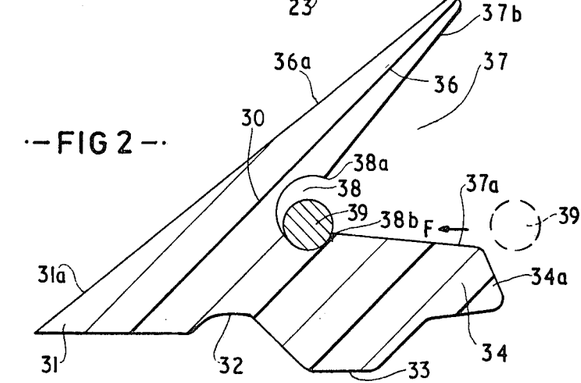

In FIG. 2, there is shown the cross-section of an element 30-39, the rubber ring 30 of which has a somewhat modified construction relative to the rubber ring 20 of FIG. 1. The terminating end portion 34 is designed somewhat shorter than the end portion 24 in FIG. 1 and, in addition, is provided with an end surface 34a directed obliquely inwards. Furthermore, the flap 36 extends in a more obliquely outwards direction than the flap 26 of FIG. 1 and the outer side 36a of the flap extends flush with the outer side 31a of the conical end portion 31. There is illustrated an inwardly directed shoulder portion 38a and an outwardly directed shoulder portion 38b between the cavity 38 and the inner surface 37a and outersurface 37b respectively of the gap 37. According to FIG. 2, the reinforcing ring 39 is led with a catch action past the shoulder portion 38b to the cavity 38 but, otherwise, without hindrance from the shoulder portion 38a.

Figure 3:
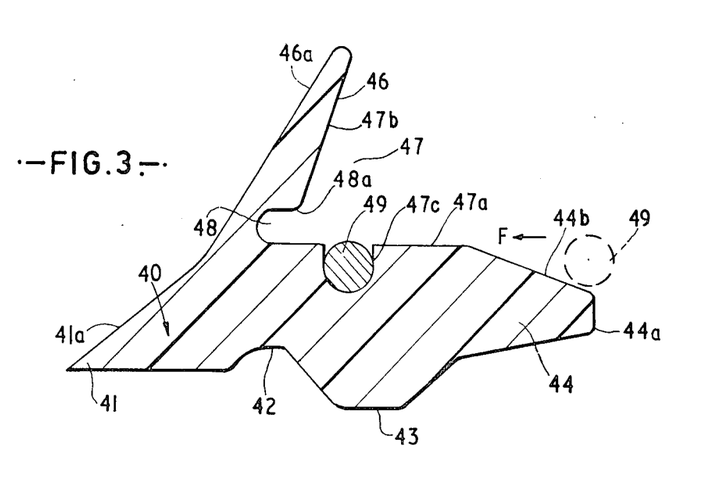

In FIG. 3, there is shown the cross-section of an element 40-49, the rubber ring 40 of which has a further modified construction relative to the rubber ring 20 of FIG. 1. The terminating end portion 44 is thickly terminated as illustrated correspondingly in FIG. 1, but is shown with a guide surface 44b extending obliquely upwards from the end surface 44a and over towards the inner gap surface 47a. In the inner gap surface 47a, there is formed a cavity 47c for the reception of the reinforcing ring 49 as shown in cross-section in full lines. In the position shown in dotted lines, the reinforcing ring 49 is shown ready for mounting. The reinforcing ring 49 is pushed along the guide surface 44b and the gap surface 47a is snapped into engagement with the cavity 47c. This assembly takes place unhindered by the relatively abruptly directed flap 46. The outer surface 46a of the flap forms a concave angle with the outer surface 41a of the conical end portion 41. The flap 46, as above, is locally reduced to form a recess 48 at the end remote from the free end to permit ready bending.

Figure 9:
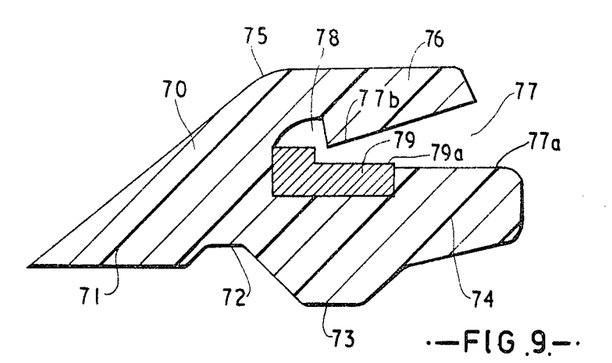
FIGS. 9 and 11 are cross-sectional representations of two further embodiments of the element.
Figure 11:
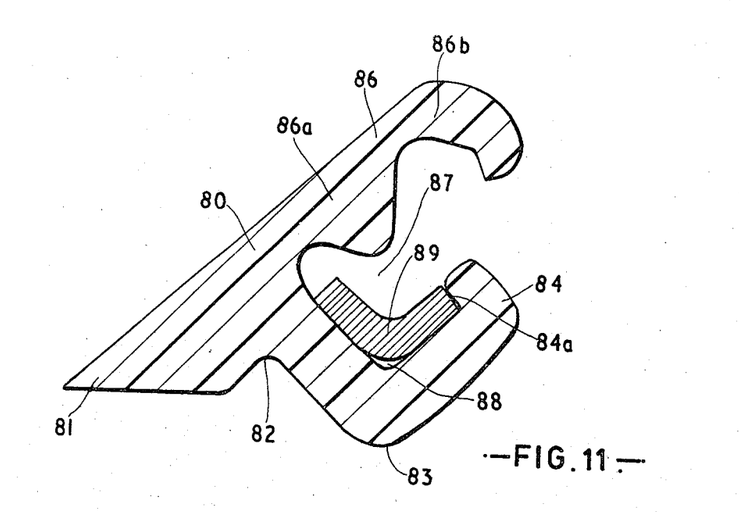

The elements 20-29, 30-39 and 40-49 which are illustrated in FIGS. 1-3 comprise, as mentioned, a rubber ring and a reinforcing ring. The rubber ring can, for example, be produced by extrusion, suitable rubber profile lengths being divided from an extruded rubber strand and joined together by glueing or vulcanisation to the enclosed rubber ring form. Alternatively, the rubber ring can be produced in the final rubber ring form by pressing or injection moulding. The rigidity of the rubber can be adapted according to the mode of application and can in certain instances be produced with a relatively large rigidity, while in other instances it can be produced with a larger elasticity. The reinforcing ring can be made of steel or metal, such as aluminum or a suitably rigid and relatively nonelastic plastic material. In the embodiments which are illustrated in FIGS. 1 to 3, there is employed, as an example, a steel ring of circular cross-section but various other suitable cross-sections can also be employed, for example, such embodiments as shown in FIGS. 9 and 11. Each and all examples are based on a steel ring, these giving great strength in relation to price but in other cases where, for example, weight, corrosion resistance or other circumstances can be of significance, other materials can, of course, be selected for the reinforcing ring. In the embodiments of FIGS. 1 to 3, the objective is that the rubber ring shall surround the steel ring as accurately as possible so as to prevent or at any rate reduce thereby the danger of corrosion. In this connection, a steel ring with a circular cross-section can be easily fitted in uniform abutment with a circular cavity in the interior of the rubber ring, a steel ring can be made of a low cost material and nevertheless prevent or reduce the danger of corrosion to a significant degree.

Figure 4:
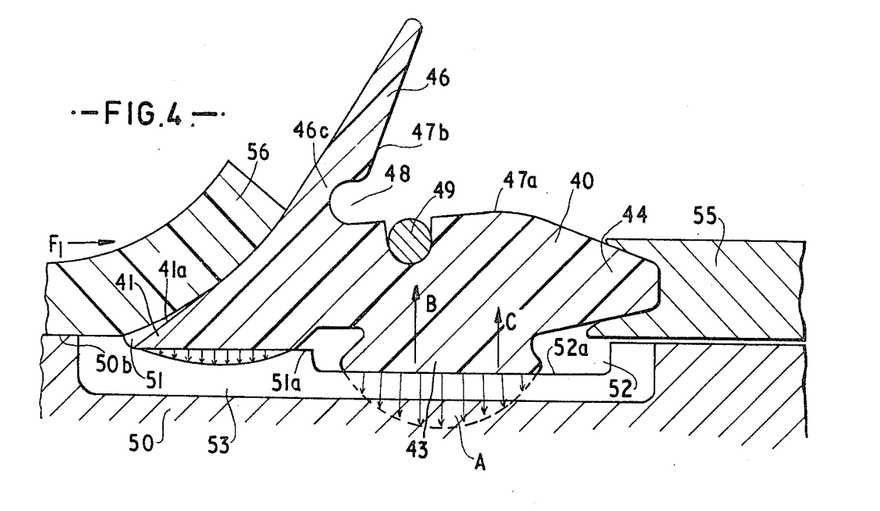
FIGS. 4 to 6 show various steps of a process of socket manufacture with the element represented schematically in section and based on the embodiment of FIG. 3, FIGS. 7 and 8 are schematic representations in section of the mounting of an insert end in a socket end based on the embodiment of FIG. 3 and the process of FIG. 4 to 6.
Figure 5:
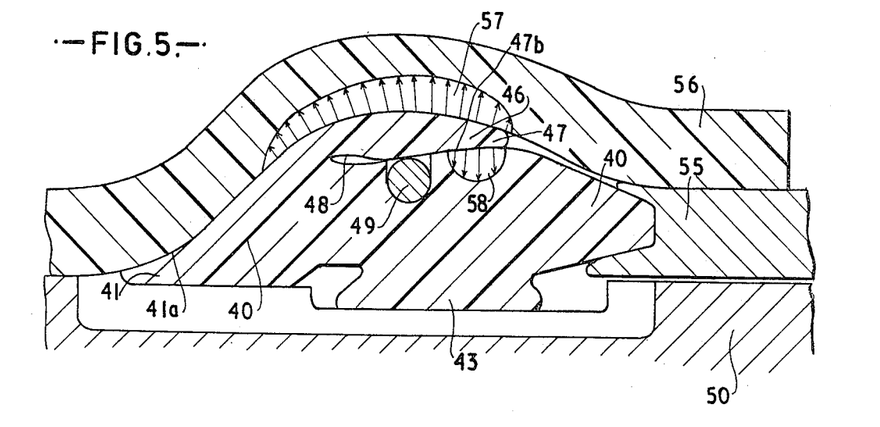
Figure 6:
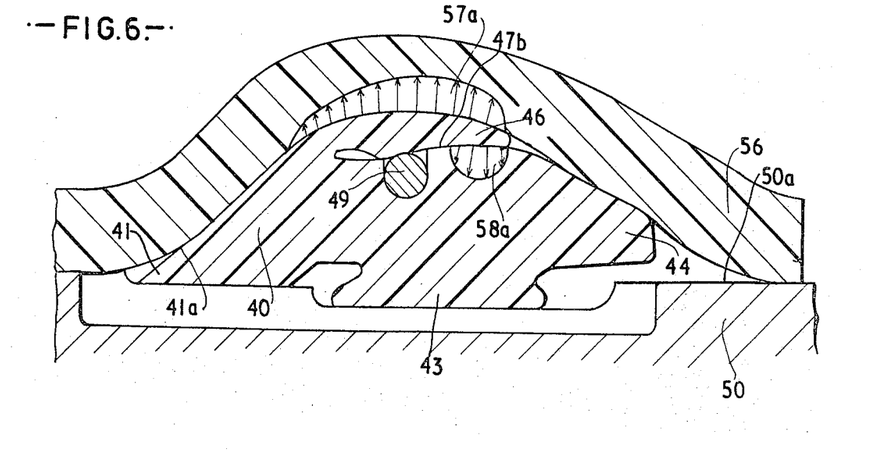

There are illustrated in FIGS. 4 to 6, three phases of the production of a socket end in a thermoplastic pipe by means of the element 40–49 as shown in FIG. 3. In FIG. 4, there is shown the element 40–49 arranged on a drift 50 with the one end portion 41 resting against a seat 51a in a first annular cavity 51 just inside the main surface 50b of the drift, while the projection 43 of the element after compression is supported in a seat 52a in another annular deeper cavity 52 within the main surface of the drift. The deeper cavity 53 shows one of several longitudinal slots which project laterally outside the cavities 51 and 52 communicating with a vacuum duct 54 which is connected to a vacuum source (not shown). The terminating end portion 44 of the element forms an abutment against a support ring 55 which is axially displaceable separately on the drift 50.

In the embodiment which is illustrated in FIG. 3 (and in FIGS. 1 and 2), there is employed a reinforcing ring of circular cross-section. In this instance, particular care has been taken in the design of the rubber ring to ensure that the latter will be prevented from being twisted or pulled out of engagement with the reinforcing ring. In this connection, the reinforcing ring is disposed laterally displaced relative to the projection 43 of the rubber ring, that is to say displaced somewhat sideways in a direction towards the end portion 41 of the rubber ring. By such a location, support for the rubber ring is ensured on both sides of the reinforcing ring, that is to say a support against the drift via the projection 43 on the one side and a support against the drift via the end portion 41 on the other side. During the pushing on of the element on the drift in the direction of the arrow F, (indicated in FIG. 4), the twisting of the rubber ring about the reinforcing ring can thereby be counteracted. A corresponding effect can also be obtained during the introduction of an insert end into the fabricated socket end (see FIGS. 7 and 8). A further favourable effect is achieved while the element is received on the drift and one shall ensure that the hot pipe end slides smoothly and unhindered over from the drift to the rubber ring. It will be evident from FIG. 4 that the pressure forces as indicated by the arrow diagram A below the compressed projection 43 on the rubber ring 40 provide as a reaction force a main component B which is discharged into the reinforcing ring while a partial component C produces a turning moment (counter-clockwise direction) about the reinforcing ring 49. This turning moment ensures that the edge portion 41 of the rubber ring is pressed downwards towards the seat 51a in the ring cavity 51.

In other embodiments where the reinforcing ring is given other cross-sections (see for example the constructions according to FIGS. 9–11), the whole of the reaction force from the deformation of the projection 43 can be allowed to discharge into the reinforcing ring since the cross-sectional form of the reinforcing ring can prevent slipping or twisting of the rubber ring and can ensure that the end portion is held in place in the channel 51. If such constructions are selected, it must, however, be taken into consideration at the same time that such more elaborate cross-sectional shapes for the reinforcing ring can invite somewhat greater problems with the insertion in the rubber ring than a reinforcing ring of circular cross-section. However, it is apparent that a relatively wide insert gap is of particular significance also for such cross-sectional shapes which depart from the said circular cross-sectional form.

It must also be mentioned that the insert gap will be enclosed during the moulding of the hot pipe and over the element 40–49 and furthermore closed as a consequence of the vacuum effect which is exerted towards the hot pipe end and which is transmitted to the insert gap. This moulding effect combined with the vacuum effect will effectively ensure that the insert gap is closed during the fabrication of the socket end and remains closed on withdrawal of the produced socket end with associated sealing element from the drift.

The said vacuum effect and the subsequently effective closing off of the insert gap thereby also has significance for the protection of the reinforcing ring against corrosion. This means that in practice one can permit relatively moderate cross-sectional areas in the reinforcing rings employed without thereby risking the destruction of the elements as a consequence of corrosion of the reinforcing ring.

It must also be mentioned that the vacuum effect has a favourable influence on the formation of the outer flap to the position which is shown in FIG. 6.

There is utilized, in the illustrated embodiment, a socket-forming apparatus corresponding to that which is disclosed in U.S. Pat. No. 3,776,682, but other socket-forming apparatuses, for example, corresponding to that shown in U.S. Pat. No. 3,793,427 can also be employed. In the illustrated embodiment, there is employed a conically pointed rubber ring edge in order that the one cone surface shall form a guide surface in the mould element rising obliquely upwards. In the apparatus according to U.S. Pat. No. 3,793,427, there can be employed, on the other hand, a mould element without the characteristic conical entering edge and associated conical guide surface. Such a modified construction of the mould element is not disclosed further here.

To the left in FIG. 4 there is shown the hot pipe end 56, while this is led upwards along the surface 41a of the element 40–49 and the element is supported in an axial direction against the support ring 55. By continuing the displacement of the pipe end 56 upwards along the flap 46, the flap can be bent and pressed inwardly towards the inner gap surface 47a as a consequence of the elastic forces of the pipe end combined with the reduced wall thickness at the inner end 46c of the flap as illustrated in FIG. 5. In this way, the recess 48 will be able to be folded together and the gap surface 47b pressed against the gap surface 47a. In FIG. 5, the hot pipe end is pushed into position over the back portion of the element and further over along the outer surface of the support ring.

By the arrow areas 57 and 58 in FIG. 5, there is illustrated schematically the clamping force between the flap 46 and the inner side of the hot pipe end and between the flap 46 and the outer portion of the gap surface 47b respectively, while the pipe end is still relatively hot and plastic. In FIG. 6, the pipe end is shown after the support ring 55 is withdrawn from the pipe end and after the outer portion of the pipe end is sucked into position against the main surface 50a of the drift by means of the vacuum. With the arrow areas 57a and 58a, there is illustrated schematically the clamping force between the flap 46 and the inner side of the pipe end and between the flap 46 and the outer portion of the gap surface 47b respectively while the pipe end is cooled, that is to say after the inherent contractional forces which are exerted in the pipe end on cooling of the latter are exerted in full intensity against the element 40–49. The arrow areas 57a and 58a illustrate, consequently, the elastic force which is exerted by the flap 46 of the element 40–49 against the inner side of the socket end after the socket end is finally fabricated.

A corresponding fabrication can be carried out with the element 30–39 according to FIG. 2, the only difference being that the inner surface of the cavity 38 closes uniformly against the reinforcing ring 39, while the gap surfaces 37a and 37b are simultaneously pressed together against each other. In this instance, however, there is achieved a more moderate bending of the flap 36 than is the case in FIG. 3.

By employing the element 20–29 according to FIG. 1, the inner surface of the cavity 28 closes against the reinforcing ring 29, while the gap surfaces 37a and 37b are, at the same time, pressed against each other. In that the bending movement of the flap 26 is more moderate than in the flap according to FIG. 2 and the flap according to FIG. 3, there can be obtained a more moderate pressure force between the flap and the hot pipe end so that it can be desirable with thinner pipes etc. If necessary, the bending of the flap 26 can occur wholly or in part as a consequence of the elastic contraction forces in the hot pipe end and/or during the drawing of the outer portion of the hot pipe end against the drift by means of the vacuum. By means of the vacuum effect one can ensure, at the same time, that the inner surface of the cavity 28 is disposed almost air tight against the reinforcing ring.

Figure 7:
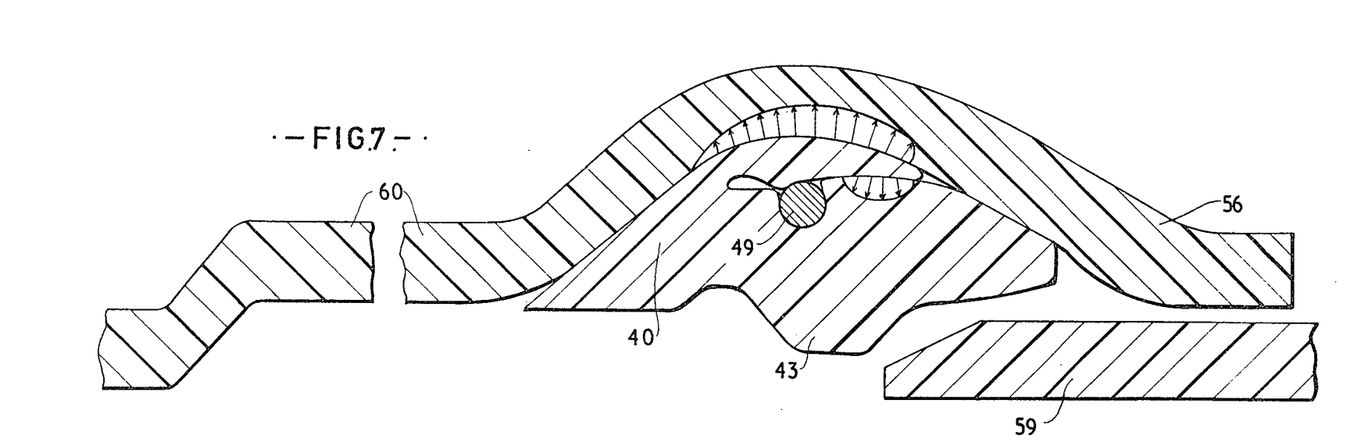
Figure 8:
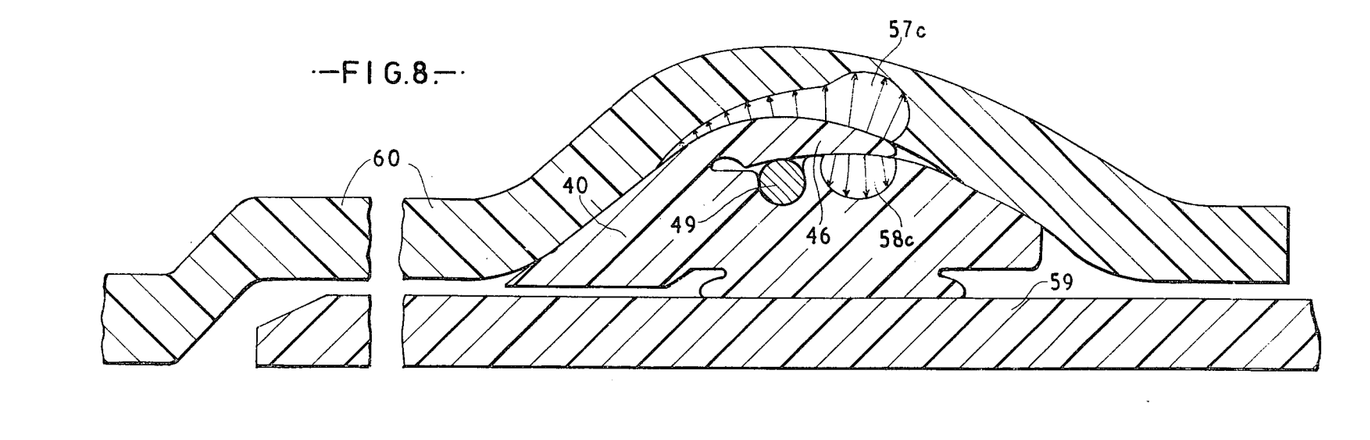

In FIG. 7, there is indicated the insertion of an insert end 59 of a first pipe in a socket end 60 of a second pipe which is fabricated according to the invention. In FIG. 8, the insert end 59 is shown pushed into position in the socket end 60 during compression of the projection 43, that is to say that portion which forms the sealing portion against the insert end. The arrow areas 57c, 58c in FIG. 8 correspond substantially to the arrow areas 57a, 58a which arise in the socket end in its finally fabricated condition on the drift 50 (FIG. 6).

In a ready mounted pipe conduit, the outer flap of the rubber ring has an especially favourable effect since the compression which is exerted in the flap during the moulding of the hot pipe end over the mould element 49 is mainly employed to hold the flap in the bent condition with a supporting abutment against the opposing gap surface of the rubber ring. On a vacuum appearing in the pipe conduit per se (that is to say to the left of the element 40–49 in FIG. 8), the flap 46 will be able to serve as an extra lip seal against the associated annular groove in the socket end. By an excess pressure occurring in the pipe conduit, the sealing element will be pressed forward thus ensuring a self-sealing effect against the annular groove in the socket end.

Figure 10:
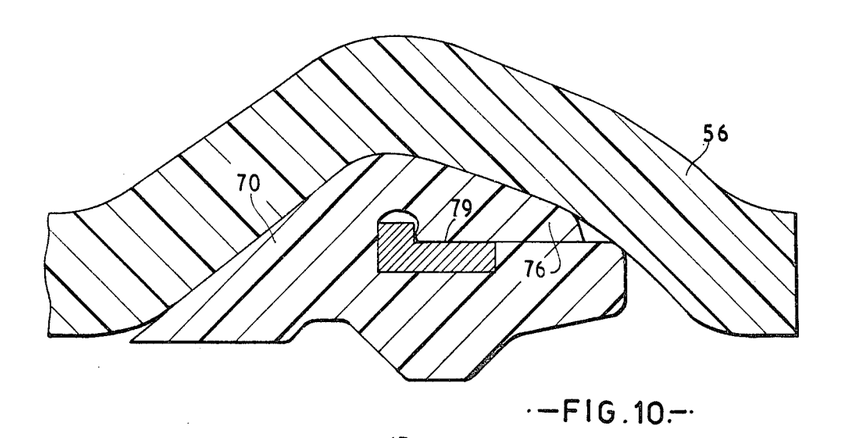
FIGS. 10 and 12 show the elements according to FIGS. 9 and 11 after manufacture of the socket end with the associated element.

In FIG. 9, there is employed in the element 70–79, instead of a reinforcing ring of circular cross-section (as shown in FIGS. 1 to 3), a reinforcing ring 79 of L-shaped cross-section, the cavity 78 having been modified correspondingly. In the case illustrated, side surface 79a of the L-shaped end is substantially flush with the inner gap surface 77b of the rubber ring 70. As shown in FIG. 10, where the element 70–79 is shown secured in position in the socket end of the thermoplastic pipe, the flap 76 forms a support partially against one side surface 79a of the reinforcing ring 79 and in part against the gap surface 77a of the rubber ring 70. In the illustrated embodiment, the reinforcing ring 70 is arranged radially outside the projection 73 which forms the main sealing part of the element 70–79, that is to say that part of the element of the socket end which forms the sealing abutment against the insert end of the cooperating pipe.

Figure 12:
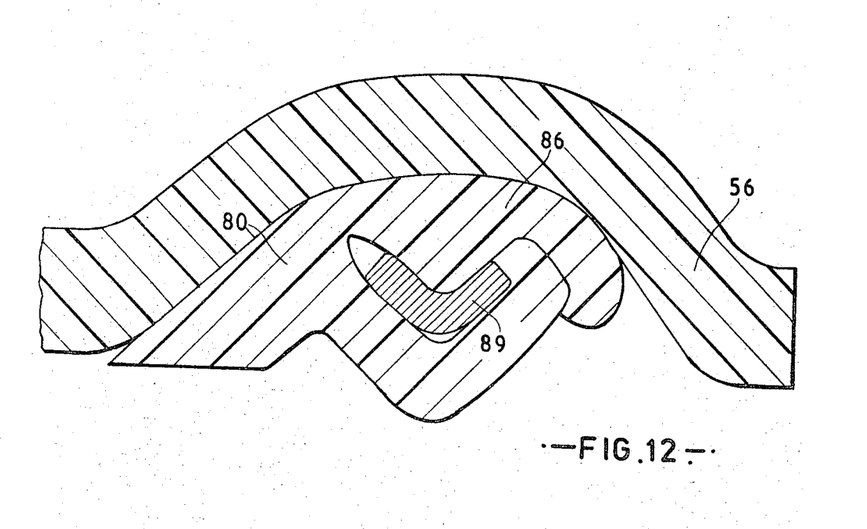

In FIG. 11, there is illustrated an element 80–89 having a reinforcing ring of V-shaped cross-section in which the rounded off angle point of the V-shaped is directed radially inwards. In this instance, the insert gap 87 is defined between an outer flap 86 of approximately F-shape cross-section and an inner flap 84 of approximately C-shaped cross-section. On assembling the reinforcing ring 89 in the rubber ring 80, the reinforcing ring is snapped into place behind the rearwardly extending outer flap portion 84a of the flap 84, as shown in FIG. 11. In the finally fabricated socket end the one arm 86a of the F-shape is received in the cavity 88 of the V-shape, while the other arm 86b of the F-shape is snapped into place round about the outer flap portion 84a of the flap 84, as is shown in FIG. 12.

Figure 13:
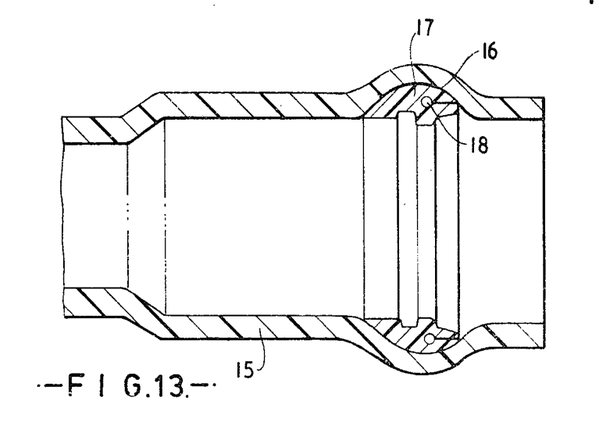
FIG. 13 illustrates a cross-sectional view of a socket end of a pipe having a combined mould and seal element therein in accordance with the invention.

Referring to FIG. 13, a pipe 15 which is subjected to a molding operating as above described has a socket 16 in which a mold and sealing element as above described is disposed. As shown, the body 17 of the element is securely retained in place via the core 18 while the core 18 is itself retained in place by the closing of the flap of the body 17 on the opposed portion of the body 17.

What we claim is:

1. In combination, a thermoplastic pipe having a socket end including an internal annular groove; and a combined mould and sealing element suitable for sealing off a joint between said socket end and an insert end of a cooperating pipe for being used as a portion of a body of a mould for both fabricating said socket end of said pipe and simultaneously inserting said element in said internal groove, said element consisting of a main body disposed in annular form composed of an elastically yielding material housing a reinforcing core of relatively non-elastic material capable or retaining its shape relative to said main body, said main body having a radial outer portion adapted to its active condition to abut the bottom of said internal groove and in an inactive condition to project freely outwards as a flap to define with an inner and opposing portion of said body an opening dimensioned to facilitate ready introduction and housing of said reinforcing core in said main body, said flap having a wall thickness which is locally reduced relative to said flap and said body at a position remote from the free end of said flap to define a recess to permit ready bending and clamping of said flap against said inner and opposing portion to close off said opening and thereby simultaneously preclude access to said reinforcing core on completing the transition from said inactive to said active condition during relative movement of said socket end of said pipe over the insert end of a cooperatng pipe.

2. The combination of claim 1, wherein said flap together with said inner and opposing portion define an insertion slot converging inwardly to a cavity for housing said reinforcing core in the interior of said main body, the outer side of the flap in said inactive condition forming a surface having a shape selected from the group consisting of convex, rectilinear and concave relative to the outer surface of the adjacent main body portion.

3. The combination of claim 1, wherein the flap and said inner and opposing portion of said main body define a cavity for receiving said reinforcing core having a cross-section selected from cross-section of O-, I-, L- and V-shape, portions of said flap and said inner and opposing portion being adapted in the active condition to grip corresponding portions of the periphery of said reinforcing core radially inwards and cooperatingly to retain said core in said main body of said element.

4. The combination of claim 3, wherein said inner and opposing portion of said main body is a free-ended flap with a thickness at a position remote from its free end which is large relative to the thickness of that end.

5. The combination of claim 3, wherein said flap has an approximately F-shaped cross-section while said inner and opposing portion has an approximately C-shaped cross-section, said reinforcing core having a substantially V-shaped cross-section with the point of the angle directed inwardly into the hollow space of the C-shape.

6. The combination of claim 1, wherein said elastically yielding material of said annular main body is a rubber ring and said reinforcing core is in the form of a ring formed from a relatively non-elastic material selected from the group consisting of a steel, metal and a rigid plastics material.

7. The combination of claim 6, wherein said reinforcing ring is of substantially circular cross-section.

8. Process for producing a socket end in a thermoplastic pipe which comprises
   (a) arranging on a drift a combined mould and sealing element having a main body of elastically yielding material of annular form with a radial outer flap defining an opening between an inner and opposing portion of said main body and flap and a reinforcing core of relatively non-elastic material capable of retaining its shape relative to said main body housed within said opening;
   (b) moulding the socket end in said pipe by the steps of
      (i) passing one end of said pipe while hot over said drift and its associated combined mould and sealing element and
      (ii) redially compressing said pipe end against said drift and said element thereby forming an internal groove in said socket end;
   (c) permanently locating said element in said groove by bending and clamping the flap against the inner and opposing portion of said main body of the element during at least one of steps (i) and (ii) to close off the opening therebetween and preclude access to the reinforcing core; and
   (d) withdrawing said pipe from said drift with said element permanently located in said groove for subsequent relative movement of said pipe and element over an insert end of a second pipe.

9. In combination, a first thermoplastic pipe having a socket and including an internal groove; and a combined mould and sealing element retained in said groove, said element comprising a main body of annular form and elastically yielding material, said body having a flap, an opposing portion and a cavity between said flap and said opposing portion, said flap having a wall thickness which is locally reduced relative to said flap and said body at a position remote from the free end of said flap to define a recess to permit ready bending and clamping of said flap against said opposing portion to close off said cavity, and a reinforcing core of relatively non-elastic material disposed in said cavity between said flap and said opposing portion to retain said element in said pipe for subsequent relative movement of said pipe and element over an insert end of a cooperating pipe.

10. The combination as set forth in claim 9 which further comprises a second pipe having an insert end within said socket end of said first pipe in sealing relation with said main body.

* * * * *

UNITED STATES PATENT AND TRADEMARK OFFICE
CERTIFICATE OF CORRECTION

PATENT NO. : 4,299,412
DATED : November 10, 1981
INVENTOR(S) : Gunnar Parmann

It is certified that error appears in the above—identified patent and that said Letters Patent is hereby corrected as shown below:

Col. 3, line 40, after "6" change "." to --,--.

Col. 4, line 61, change "nonelastic" to --non-elastic--.

Col. 5, line 44, after "arrow" change "F," to --$F_1$--.

Col. 9, line 6, after "wherein" change "the" to --said--.

Col. 9, line 9, change "cross-section" to --cross-sections--.

Col. 10, line 8, change "redially" to --radially--.

Signed and Sealed this

Twenty-third Day of February 1982

[SEAL]

Attest:

GERALD J. MOSSINGHOFF

Attesting Officer

Commissioner of Patents and Trademarks